United States Patent [19]

Wada

[11] 4,136,261
[45] Jan. 23, 1979

[54] AUTOMATIC ANSWERING DEVICE IN FACSIMILE

[75] Inventor: Tasaku Wada, Tokyo, Japan

[73] Assignee: Kokusai Denshin Denwa Kabushiki Kaisha, Japan

[21] Appl. No.: 881,859

[22] Filed: Feb. 27, 1978

[30] Foreign Application Priority Data

Mar. 1, 1977 [JP] Japan .................................. 52-20901

[51] Int. Cl.² .................. H04M 1/56; G11B 5/80; H04N 1/28
[52] U.S. Cl. .................................. 179/2 R; 179/5.5; 358/301; 360/2; 360/81
[58] Field of Search .................. 179/5.5, 2 TV, 2 R; 358/301, 293; 360/2, 81, 101

[56] References Cited

U.S. PATENT DOCUMENTS

| | | | |
|---|---|---|---|
| 3,818,500 | 6/1974 | Lemelson | 360/2 |
| 3,946,158 | 3/1976 | Leclercq et al. | 179/5.5 |
| 3,995,316 | 11/1976 | Kihara | 360/81 |

*Primary Examiner*—Kathleen H. Claffy
*Assistant Examiner*—Kenneth A. Chayt
*Attorney, Agent, or Firm*—Robert E. Burns; Emmanuel J. Lobato; Bruce L. Adams

[57] ABSTRACT

An automatic answering device for facsimile, in which the name or number of a station is previously stored and is automatically send out in response to a request from the other party. Storing of the name of the individual station in a magnetic record card and reading out of the recorded content are achieved by a magnetic head, which is adapted to be driven in synchronism with the main scanning operations of the facsimile apparatus. The information, such as the number or name of the individual station is previously stored in the magnetic record card from an original provided at the facsimile apparatus and read out of the magnetic card for transmitting the same to a receiving unit of another facsimile apparatus.

2 Claims, 3 Drawing Figures

SENSOR   INVERTER   LOAD

AUTOMATIC ANSWERING DEVICE IN FACSIMILE

BACKGROUND OF THE INVENTION

1. Field Of The Invention

This invention relates to a facsimile apparatus.

2. Description Of The Prior Art

In conventional facsimile communication employing a private line or a telephone circuit to which the other party is fixed, the other party is identified by a telephone call through the fixed telephone circuit and then the telephone set is switched to the facsimile apparatus. Accordingly, no automatic answering device is needed in facsimile. However, when facsimile communication is used as subscriber facsimile, especially when international facsimile services are provided as a result of development of facsimile communication, cases often occur, due to the difference in time, in which the receiving side is secured or unattended.

SUMMARY OF THE INVENTION

This invention is to provide an automatic answering device in facsimile which enables facsimile communication even if the other party is absent.

With the device of this invention, the name or number of a station is previously stored and is automatically sent out in response to a request from the other party. Storing of the name of the individual station in the magnetic record card and reading out of the recorded content are achieved by a magnetic head, which is adapted to be driven in synchronism with the main scanning operations of the facsimile apparatus, and information is stored in the magnetic record card from an original of a transmitter unit of the facsimile apparatus and read out of the magnetic card for transmitting the same to a receiving unit of a facsimile apparatus of the other party.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERED EMBODIMENTS

Figure 1:
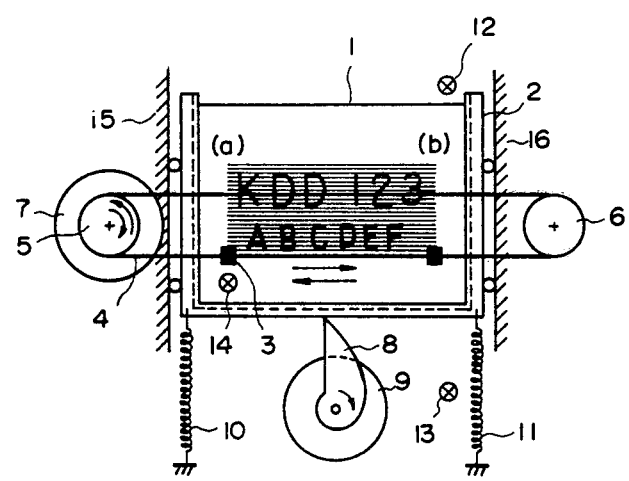
FIG. 1 is a diagram showing the mechanism unit of the automatic answering device of this invention.

With reference to FIG. 1, a mechanism unit of an automatic answering device in the facsimile apparatus of this invention will first be described. A magnetic card 1 is housed in a card holder 2, which is pulled by springs 10 and 11 to contact at one side with a cam 8. The cam 8 is coupled with the shaft of a motor 9. Since the cam 8 rotates in the direction of the arrow with the rotation of the motor 9, the card holder 2 gradually moves up. When having reached a certain position, it rapidly returns to its original position under the action of the springs 10 and 11. The magnetic card 1 moves in accordance with the configuration of the cam 8.

On the other hand, the magnetic head 3 is fixed to a wire 4 supported on pulleys 5 and 6 and is reciprocated to scan the magnetic card between points a and b by the forward and backward driving of the pulley 5 coupled with the shaft of a motor 7. At each scanning of the magnetic head 3 from the left to right direction or the right to left direction, the motor 9 is driven by a certain angle in a start-stop manner, so that the card holder 2 is fed by the cam 8 by a certain length, i.e. the width of one scanning line. With such an operation, information is stored in or read out of the magnetic card 1 by the magnetic head 3.

The above-mentioned operation is carried out in synchronism with the facsimile apparatus. A sensor 12 detects completion of the operation, and a sensor 13 detects setting of the magnetic card 1 at the original position. A sensor 14 detects the presence of the magnetic head 3 at the original position. The card holder 2 is supported by support metals 15 and 16, and hence is adapted for smooth movement.

Figure 2:
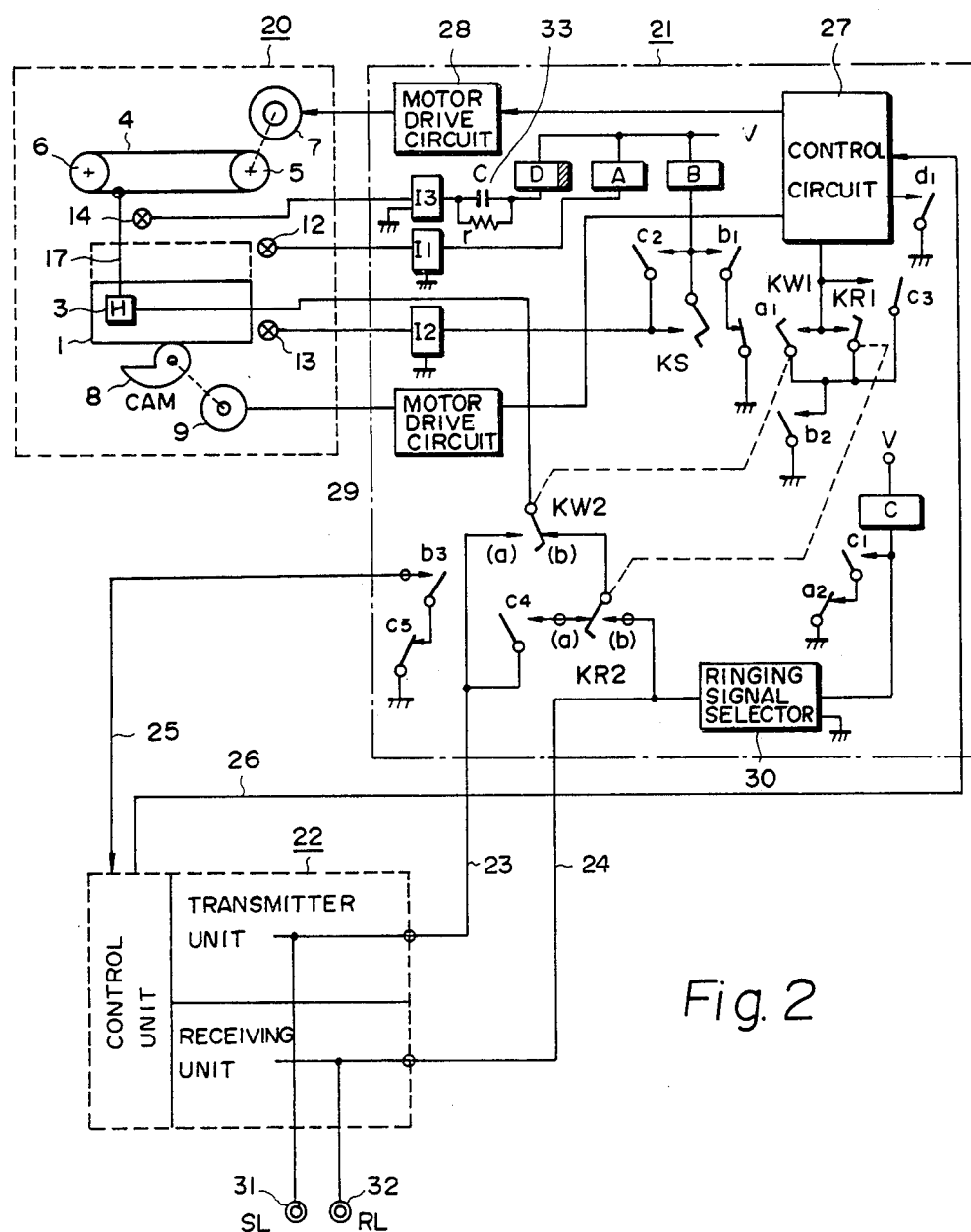
FIG. 2 is a system diagram illustrating an example of the construction of the device of this invention.

FIG. 2 is a system diagram of the automatic answering device in the facsimile apparatus of this invention. Reference numeral 20 indicates the mechanism unit shown in FIG. 1; 21 designates a control unit; and 22 identifies a facsimile apparatus of reciprocating scanning type. The magnetic head 3 is fixed to the wire 4 through a metal fixture 17. A description will be made of operations for the preparation and the checking of the magnetic card and the automatic answering.

(1) Preparation of Magnetic Card

At first, a new magnetic card is set in the automatic answering device. In the transmitter unit of the facsimile apparatus 22, there is set an original having thereon a pattern indicative of the name or number of the self individual station. The information is stored in the magnetic card 1 in the following manner.

Figure 3:
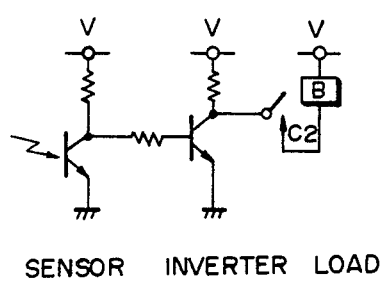
FIG. 3 is a circuit diagram showing an example of the constructions of a sensor and an inverter for use in FIG. 2.

A first step is to turn down ganged keys Kw1 and Kw2. The key KW1 is closed and the key KW2 is switched from the side (a) to the side (b). The next step is to press a start button KS. With such a circuit structure as depicted in FIG. 3, an inverter $I_2$ generates the ground signal, so that a relay B is actuated. The close of a contact b1 self-holds the relay B while the close of a contact b2 actuates a control circuit 27, which is composed, for example, of a clock pulse generator and a counter for driving the motors 7 and 9 through motor drive circuits 28 and 29, respectively. Further, the close of a contact b3 actuates a control unit of the facsimile apparatus 22, so that a signal obtained by reading out the original of the transmitter unit is applied via the key KW2 (held on the side b) to the magnetic head 3 for recording the signal on the magnetic card 1.

When the magnetic card 1 is shifted by the cam 8 to the position of the sensor 12, a relay A operates via an inverter $I_1$ with a circuit structure similar to that shown in FIG. 3. This breaks a contact a1 to restore the relay B. The break of the contact b2 restores the control circuit 27, and the break of the contact b3 restores the facsimile apparatus 22. When the magnetic head 3 is returned to the original position, the sensor 14 actuates a relay D of the slow release type via an inverter $I_3$ and a time constant circuit 33 with a circuit structure similar to that shown in FIG. 3, and the control circuit 27 is further actuated by the close of a contact d1 to actuate only the motor drive circuit 29 until the cam 8 is brought back to the original position. This is carried out within the slow release time of the relay D. Then, the keys KW1 and KW2 are returned to their original positions, thus completing the preparation of the magnetic card.

(2) Check of Magnetic Card

A description will be given about the operation for checking the magnetic card 1 by recording its content in the facsimile apparatus 22 in the state in which the magnetic card 1 recorded thereon the name or number of the station is set.

At first, the ganged keys KR1 and KR2 are turned down. The key KR1 is closed and the key KR2 is switched from the side (a) to the side (b). Then, the start button KS is pressed. Since the inverter $I_2$ generates the ground signal, the relay B is actuated. The close of the contact b1 self-holds the relay B while the close of the contact b2 actuates the control circuit 27 to drive the motors 7 and 9 through the motor drive circuits 28 and 29, respectively. Further, the close of the contact b3 actuates the control unit of the facsimile apparatus 22 for starting a receiving operation of the receiving unit. The signals recorded on the magnetic card 1 are read out by the magnetic head 3 of the mechanism unit 20 and are applied to the receiving unit of the facsimile apparatus 22 via the side (a) of the key KW2, the side (b) of the key KR2 and a connection line 24. The magnetic card 1 is moved by the cam 8 to reach the position of the sensor 12, the relay A is actuated via the inverter $I_1$ in the same manner as described above. The following operations for returning the circuit elements to their original state are exactly the same as those in the case of preparation operation described above in the operation (1). The keys KR1 and KR2 are returned to their original positions.

(3) Automatic Answering Operation

A description will be given of the operation in a case of receiving a call from the calling party in the state in which the magnetic card 1 recorded thereon the name or number of the called station is set in the mechanism unit of the automatic answering device.

A ringing signal from the calling party reaches a ringing signal selector 30 via an input terminal 32, the receiving unit of the facsimile apparatus 22 and the connection line 24. Upon detection of the ringing signal by the ringing signal selector 30, the ground signal is generated to actuate a relay C, which is self held by the close of a contact c1. A contact c2 is closed to actuate the relay B (see FIG. 3), and contacts c3 and b2 are closed to operate the control circuit 27, for driving the motors 7 and 9 via the motor drive circuits 28 and 29, respectively. A contact c4 is closed to send the read out signal of the magnetic head 3 to the other party from a transmitting terminal 31 through a path : [the side (a) of the key KW2, the side (a) of the KR2, a contact c4 closed and a connection line 23]. A contact c5 breaks to make the control unit of the facsimile apparatus 22 inoperative. The subsequent restoring operations are the same as those described above in the operation (1) and are achieved by the operations of the relays A and D.

Table 1 shows an example of the automatic answering operation in a case of a telephone exchange circuit.

As described above in detail, the automatic answering device of this invention is ganged with facsimile apparatus and makes it possible to freely store and send out the handwritten name, number or symbol of the called station and can be realized small in size and at low cost. Further, since the automatic answering device is easy to rewrite and read out the magnetic card and is ganged with the facsimile apparatus, the control unit can be used in common.

Table 1

| (Transmitting side) | (Line) | (Receiving side) |
|---|---|---|
| (1) Hooking on telephone set and dialling | Dial signal | (1) Receiving ringing signal, and operating ringing signal selector |
| (2) Receiving name or number of station by facsimile (identification) | Name or number of station (within 10 sec.) | (2) Sending out name or number of station (automatic answering) |
| (3) Setting original on facsimile transmitter unit | Picture signal | (3) Receiving picture signal |
| (4) Completion of transmission (removal of original) | No signal sent | (4) Completion of reception (Automatically Feeding record paper) |
| (5) Again receiving name or number of station (identification) | Name or number of station | (5) Sending out name or number station (Restarting automatic answering device) |
| (6) Hooking on telephone set (Cutting off line) | No signal sent | (6) Cutting off line |

In the state of (5), it is also possible to achieve the operation of item (2) once more for identification simultaneously with reception of a reception completion signal at the receiving side. This may be omitted. Then, the operation of (6) is carried out to complete all operations.

What I claim is:

1. An automatic facsimile station answering device, for use with a telephone line, comprising:
    a magnetic record card for storing information identifying the associated station;
    a magnetic head for scanning said magnetic record card to record said information on said magnetic record card and to reproduce the recorded information from said magnetic record card;
    first drive mechanism operatively coupled with said magnetic head for reciprocating the magnetic head along said magnetic record card to perform the main scanning thereof;
    second drive mechanism operatively coupled with said magnetic record card for shifting said magnetic record card by a predetermined width in a direction perpendicular to the direction of said main scanning;
    detection means for detecting a ringing signal on said telephone line; and
    control means connected to said detection means, said first drive mechanism, said second drive mechanism and said magnetic head for actuating said first drive mechanism and said second drive mechanism in response to the detected output of said detection means to send out over said telephone line said information from said magnetic head.

2. An automatic answering device according to claim 1, in which said second drive mechanism comprises a cam mechanism for shifting said magnetic record card in a start-stop manner by said predetermined width and for restoring said magnetic record card to the initial position thereof after reaching the limit of perpendicular travel.

* * * * *